United States Patent [19]

Johnsen

[11] 4,212,492
[45] Jul. 15, 1980

[54] ROLL-UP TRUCK BED COVER

[76] Inventor: Walter Johnsen, Aurelia, Iowa 51005

[21] Appl. No.: 954,901

[22] Filed: Oct. 26, 1978

[51] Int. Cl.² ............................................. B60J 11/00
[52] U.S. Cl. ........................................................ 296/98
[58] Field of Search ................... 296/98, 160; 160/242, 160/243, 244, 245, 265

[56] References Cited

U.S. PATENT DOCUMENTS

| | | | |
|---|---|---|---|
| 1,443,465 | 1/1923 | Fulton | 160/245 |
| 2,976,082 | 3/1961 | Dahlman | 296/98 |
| 3,263,735 | 8/1966 | Vecchiarelli | 160/242 |
| 3,785,694 | 1/1974 | Sargent | 296/98 |

*Primary Examiner*—John J. Love

*Assistant Examiner*—Norman L. Stack
*Attorney, Agent, or Firm*—Morton S. Adler

[57] ABSTRACT

A flexible cover is provided for an open top truck bed and includes means for rolling by one person from one edge at one side of the bed in a cylindrical roll across the bed transversely of the width thereof to a position of storage at the opposite side of the bed. A length of cord is secured at one end to a generally central point on the roll starting edge of the cover so as to roll up with the cover and leave a trailing length which can be grasped and pulled to effectively unwind the rolled cover back across the truck bed. The cord also serves as a tie-down for the cover when unrolled. Fastening and tensioning means as required are provided for the cover in rolled and unrolled positions.

9 Claims, 8 Drawing Figures

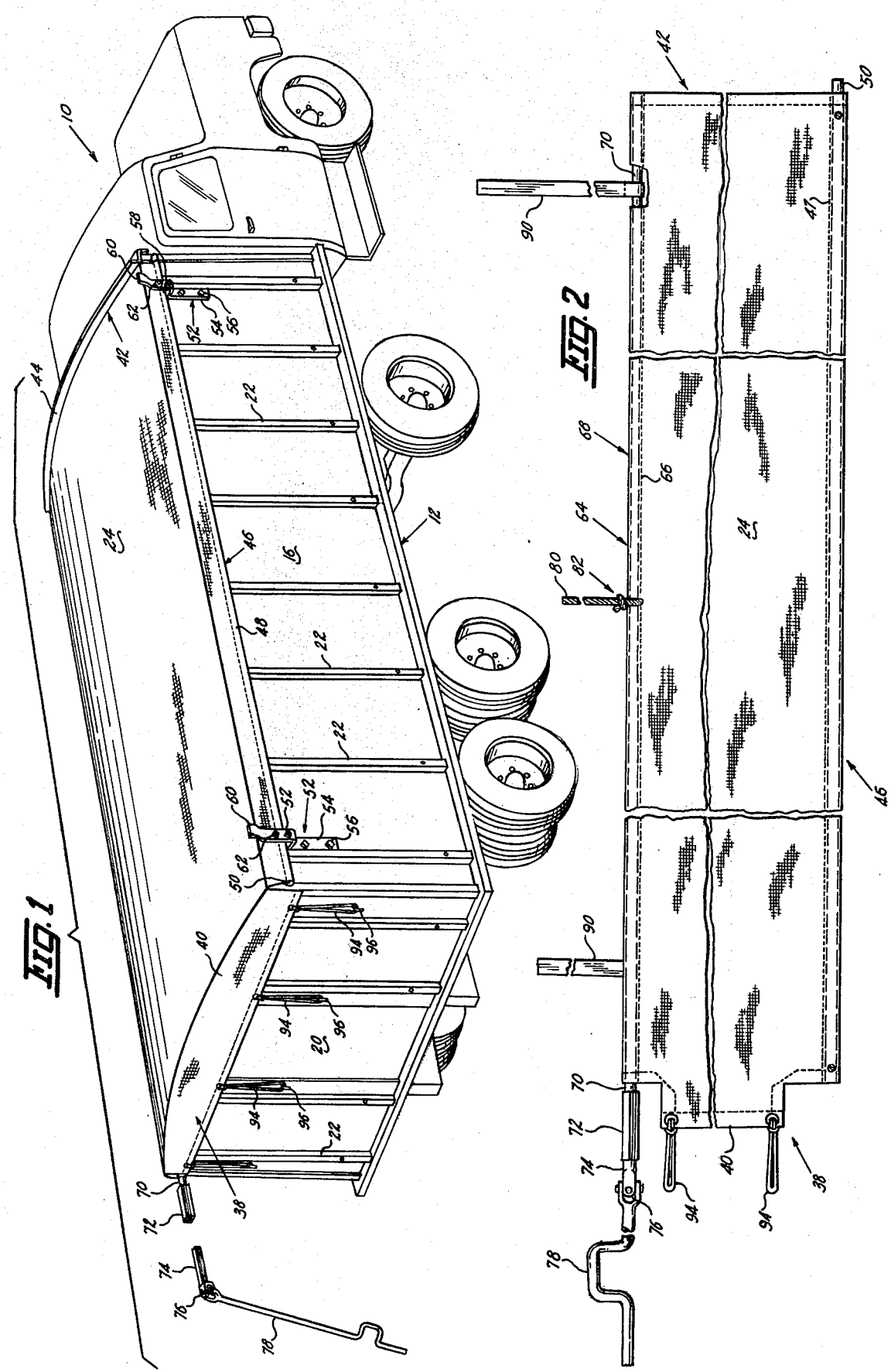

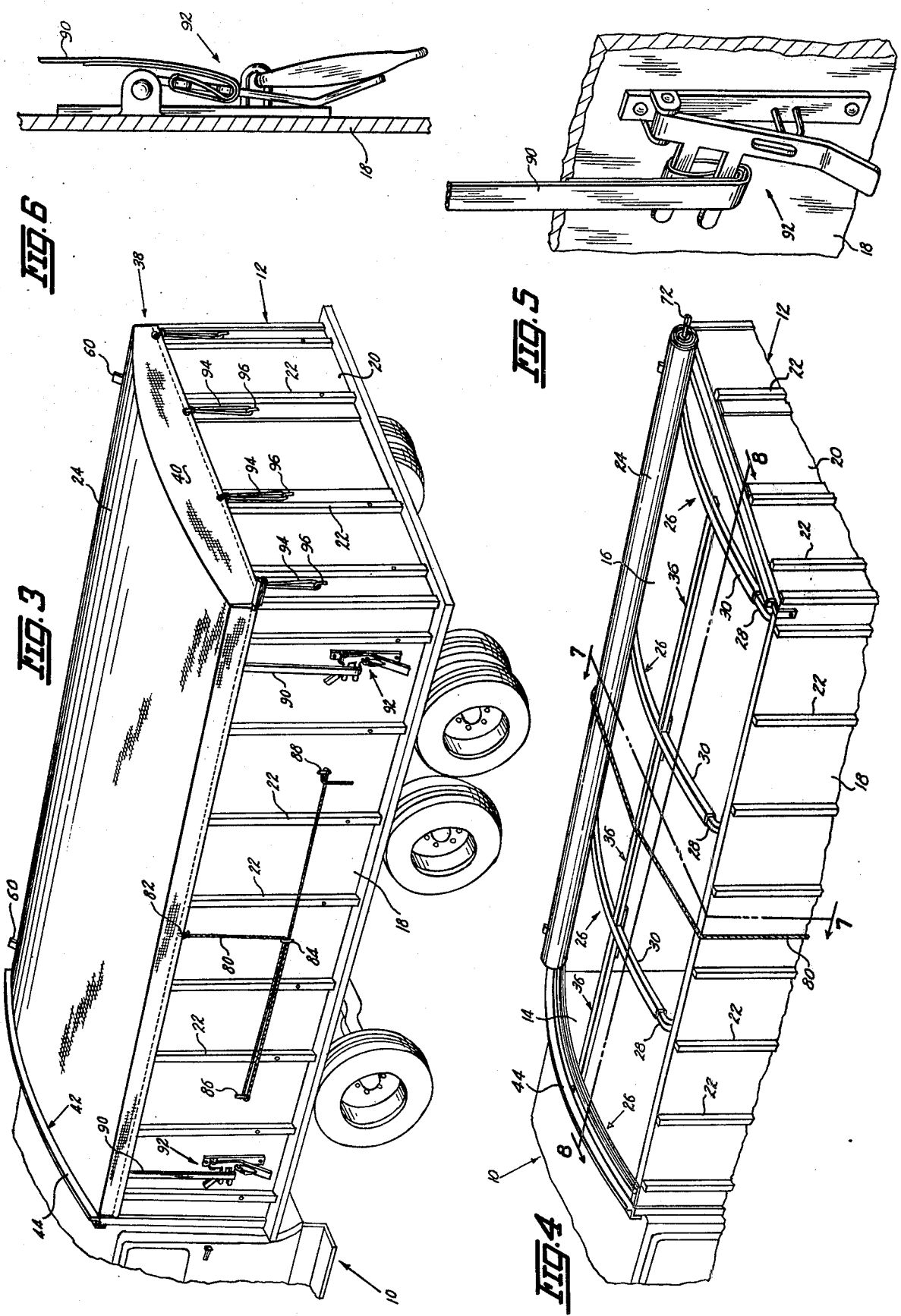

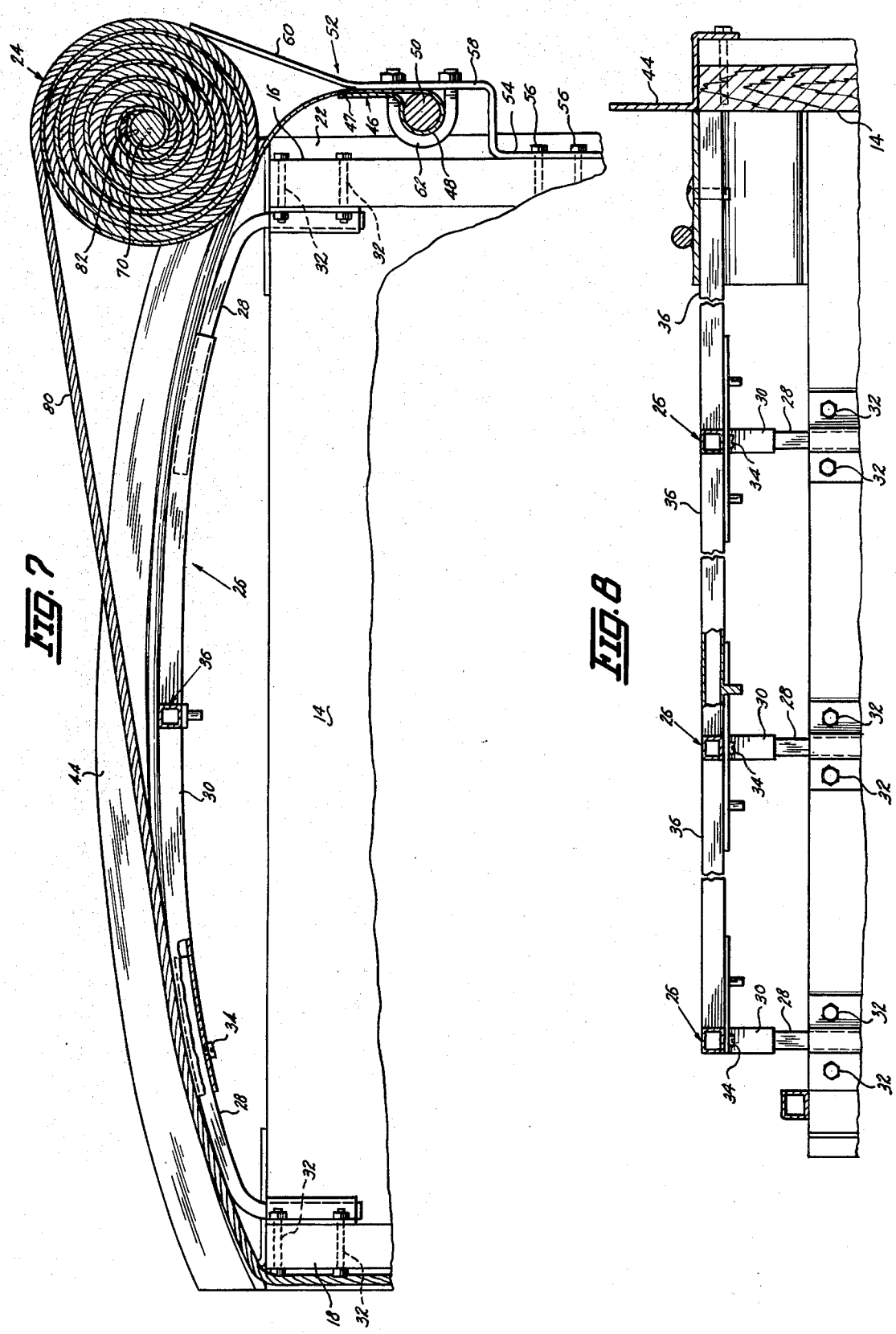

ROLL-UP TRUCK BED COVER

BACKGROUND OF THE INVENTION

This invention relates to improvements in a roll-up type of flexible cover for open top truck beds and more particularly, to a new, simple and efficient means for unrolling this type of cover.

The roll-up type of flexible cover is an old expedient as exemplified by U.S. Pat. No. 2,562,209 disclosing such a cover windable and unwindable on a spring-loaded roller and by U.S. Pat. Nos. 3,383,413 and 3,785,694 which attach a cylinder to one edge of the cover for rotation by a suitable crank both for rolling up and unrolling.

The present invention utilizes the crank operated cylinder principle for rolling up the cover from one side of the truck bed across the top thereof to the other side and has for one of its important objects the providing of improved means to easily, quickly and efficiently unroll the cover back across the truck bed without the necessity of a second manipulation of the crank component.

Another object herein is to provide a flexible cover of the above class which includes a length of cord trained in part into the convolutions of the rolled-up cover by operation of the crank and leaving a trailing portion to be grasped and pulled to effect the unrolling of the cover.

A further object of this invention is to provide a flexible truck bed cover as characterized which can be easily rolled and unrolled by a single operator.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is an exploded perspective rear view of a truck and truck bed from the curb side showing the cover of this invention in unrolled position over the bed and the crank handle used for rolling up the cover, FIG. 2 is a foreshortened top plan view of this flexible cover, FIG. 3 is a perspective rear view of the truck bed and portions of the truck from the street side showing the unrolled position of the cover as in FIG. 1, FIG. 4 is a fragmentary perspective rear view of the top portion of the truck bed from the street side showing the cover in rolled up position, FIG. 5 is an enlarged perspective view of a cover strap tie-down hook provided on the street sidewall of the truck bed, FIG. 6 is a side elevational view of the tie-down hook or fastener of FIG. 5 shown securing a cover tie-down strap, FIG. 7 is a cross sectional view taken from the line 7—7 of FIG. 4, and FIG. 8 is a cross sectional view taken from the line 8—8 of FIG. 4.

DESCRIPTION OF THE PREFERRED EMBODIMENTS

Referring to the drawings, the number 10 designates generally a truck type vehicle provided with an open top cargo bed or box 12 which includes the vertical front wall 14, spaced sidewall 16 on the curb side and 18 on the street side and the rear wall 20. Stiffeners 22 are arranged on walls 16, 18, 20 in a well known manner.

Bed 12 is braced at the upper portion of sides 16, 18 by a plurality of bow units 26 extending transversely of bed 12 in parrallel and longitudinally spaced relationship between the front wall 14 and the rear wall 20. Units 26 comprise two like angular end sections 28 (FIG. 7) of bar or tubular material and a central hollow section 30. One end of each respective end section 28 is suitably secured in abutting relationship to the inner side of a respective sidewall 16, 18 at the top portion thereof by nut and bolt means 32 and the other respective ends of sections 28 extend upwardly and inwardly towards but not to the center line of bed 12. The respective ends of the central bow section 30 are telescopically journalled on the respective inwardly extending ends of sections 28 and may be secured at selected positions thereon by the set screw 34. Bow units 26 are also supported in their spaced relationship by the centrally disposed and longitudinally alighed rigid braces 36 extending between and suitably secured to sections 30 as best seen in FIG. 4. It will be understood that bed or box 12 on truck 10 as described is only illustrative of the environment of use for the flexible cover 24 as will appear and that such an open top cargo bed may be of the type found on semi-trailers or the like.

Cover 24 is generally rectangular and is formed relative to the size of bed 12 on which it is to be used to cover the entire top of the bed and overlie portions of sidewalls 16, 18 and the rear wall 20 as seen in FIGS. 1,3. The rear end 38 of cover 24 is provided with a flap extension 40 (FIG. 2) complementary in width to the width of bed 12 for a snug overlie of the rear wall 20 (FIGS. 1,3) and at the front end 42 of bed 12, there is provided the vertically extending wind shield 44 against which the front edge of cover 24 will lie and be protected as seen in FIGS. 1,3.

The curb side edge 46 of cover 24 (FIG. 2) is anchored to the upper outside of the curb side sidewall 16 for which reference is now made more particularly to FIG. 7. Edge 46 is turned back upon itself and suitably secured as by stitching 47 to form the loop 48 in which there is placed the rigid rod 50 extending the length thereof. A pair of like brackets 52 are secured respectively to the forward and rear portions of sidewall 16 (FIG. 1) and comprise in ascending relationship, a vertical arm 54 for attachment to wall 16 by bolts 56, an offset bracket section 58 and an upwardly and outwardly extending cover support rest 60. Rod 50 is placed in brackets 52 between bracket sections 58 and sidewall 16 and secured thereto by the U bolt fasteners 62 to anchor the curb side 46 of cover 24 to the curb sidewall 16 of bed 12.

The street side edge 64 of cover 24 (FIG. 2) is turned back upon itself similarly as edge 46 and is secured by stitching 66 or the like to form a loop 68 in which there is placed the rigid cylinder such a rod or tube 70 to which edge 64 is secured in any suitable manner for rotation therewith as will appear. At the rear end 38 of cover edge 64, cylinder 70 is provided with a socket sleeve extension 72 for receiving a mating shank 74 connected by the universal joint 76 to a crank handle 78 as best seen in FIGS. 1,2.

A rope or cord 80 of indeterminate length is secured at one end 82 (FIGS. 2,7) to cylinder 70 and cover edge 64 approximately centrally of cover 24 ends 38, 42 so that it will wind or roll-up with cover 24 with the rotation of cylinder 70.

In the unrolled position of cover 24 for enclosing the open top of bed 12 (FIG. 3), cord 80 serves as one of the cover fastening or tie-down means. For this purpose, cord 80 is tightly trained through a hook 84 on sidewall 18 spaced below point 82 and because cord 80 has an extended length relative to traditional tie-down cords or straps, such length is accommodated for storage when cover 24 is unrolled by being further extended toward cover end 42 to engage hook 86 on sidewall 18 and then extended toward cover end 38 for tying to hook 88 also on sidewall 18. Further tie-down means for cover edge 64 are provided by a pair of straps 90 secured respectively to edge 64 in close proximity to the respective cover ends 38, 42 and attachable for tensioning to the respective toggle action hook members 92 (FIGS. 5,6) on sidewall 18. The rear flap 40 of cover 24 is secured in unrolled position by suitable straps 94 engageable with appropriate hooks 96 on the rear wall 20.

Cover 24 can be easily and quickly moved by a single operator from its unrolled position in FIG. 3 to its rolled up position in FIG. 4 and vice versa as follows. With straps 90, 94 disengaged and with cord 80 freed from hooks 84, 86, 88 and generally arranged perpendicularly to cover edge 64, the operator attaches crank 78 to socket 72 as described and by a clockwise rotation thereof, cover 24 is rolled across the bed 12 to to rest against support arm 60 in bracket 52. During this manipulation, cord 80, being suitably secured to cylinder 70, is also rolled up within the convolutions of cover 24 and the length of cord 80 is such that, after cover 24 is rolled up, a portion of such cord remains extended from the rolled cover over the top of bed 12 and down sidewall 18 as seen in FIGS. 4,7. To unroll cover 24, the operator simply has to grasp and pull on the free end of cord 80 to quickly unroll the cover 24 to its position in FIG. 3 where, as previously described, cord 80 is utilized as a cover tie-down element. Accordingly, in view of the foregoing, it is thought a full understanding of the construction and operation of this invention will be had and the advantages of the same will be appreciated.

I claim:

1. A flexible cover unit for an open top cargo bed on a truck and the like having spaced upright first and second sidewalls, a front wall and a back wall, said cover unit comprising:
    a flexible cover adapted to overlie the open top of the cargo bed and said first and second sidewalls,
    means securing one edge of said cover along the upper edge of said first sidewall,
    an elongated flexible member secured at one end to the opposite edge of said cover at a point generally centrally between said front and back walls,
    means operatively associated with said opposite edge of said cover for rolling said edge into a cylindrical roll across the top of the cargo bed from said second sidewall to said first sidewall,
    the rolling of said cover acting to roll said elongated flexible member in part into the convolutions of said cover whereby a selected length of said elongated flexible member remains extended from the rolled up cover, and
    the manual movement of said extended length of said elongated flexible member toward said second sidewall acting independently and directly on said convolutions to unroll said cover back across the cargo bed from said first sidewall to said second sidewall.

2. A flexible cover unit as defined in claim 1 including means on said second sidewall for storing said elongated flexible member when said cover is unrolled.

3. A flexible cover unit as defined in claim 1 including means on said first sidewall for supporting said cover in rolled up position.

4. A flexible cover unit as defined in claim 1 including means on said second sidewall for tightly securing said elongated flexible member thereto to serve as a cover tie-down means when said cover is unrolled.

5. A flexible cover unit for an open top cargo bed on a truck and the like having spaced upright first and second sidewalls, a front wall and a back wall, said cover unit comprising:
    a flexible cover adapted to overlie the open top of the cargo bed and said first and second sidewalls,
    means securing one edge of said cover along the upper edge of said first sidewall,
    a plurality of spaced cover tie-down members secured respectively to the edge of said cover overlying said second sidewall,
    at least one of said tie-down members being elongated and flexible,
    respective fastening means on said second sidewall for operable connection to said respective tie-down members,
    means operably associated with said cover edge overlying said second sidewall for rolling said edge into a cylindrical roll across the top of said bed to said first sidewall,
    the rolling of said cover acting to roll said elongated and flexible tie-down member in part into the convolutions of said cover whereby a selected length of said elongated and flexible tie-down member remains extended from the rolled up cover,
    the movement of said extended length of said elongated flexible tie-down member toward said second sidewall acting to unroll said cover back across the cargo bed from said first sidewall to said second sidewall,
    an upright wind deflector shield across the top of said front wall,
    one end of said cover being disposed to lie in abutting relationship to the bottom of said shield when said cover is unrolled,
    a flap on the opposite end of said cover adapted to overlie said back wall, and
    fastening means on said flap operatively engageable with said back wall when said cover is unrolled.

6. A flexible cover unit as defined in claim 5 including means on said first sidewall for supporting said cover in rolled up position.

7. A flexible cover unit for an open top cargo bed on a truck and the like having spaced upright first and second sidewalls, a front wall and a back wall, said cover unit comprising:
    a flexible cover adapted to overlie the open top of the cargo bed and said first and second sidewalls,
    means securing one edge of said cover along the upper edge of said first sidewall,
    an elongated flexible member secured at one end to the opposite edge of said cover at a point generally centrally between said front and back walls,
    means operatively associated with said opposite edge of said cover for rolling said edge into a cylindrical roll across the top of the cargo bed from said second sidewall to said first sidewall, the rolling of said cover acting to roll said elongated flexible member in part into the convolutions of said cover whereby a selected length of said elongated flexible member remains extended from the rolled up cover, the movement of said extended length of said elongated flexible member towards said second sidewall acting to unroll said cover back across the cargo bed from said first sidewall to said second sidewall, an upright wind deflector shield across the top of said front wall, one end of said cover being disposed to lie in abutting relationship to the bottom of said shield when said cover is unrolled, a flap on the opposite end of said cover adapted to overlie said back wall, and fastening means on said flap operatively engageable with said back wall when said cover is unrolled.

8. A flexible cover unit as defined in claim 1 including:
an upright wind deflector shield across the top of said front wall, and
one end of said cover being disposed to lie in abutting relationship to the bottom of said shield when said cover is unrolled.

9. A flexible cover unit as defined in claim 1 including:
a flap on that end of said cover adapted to overlie said back wall, and
fastening means on said flap operatively engageable with said back wall when said cover is unrolled.

* * * * *